(12) United States Patent
Stefanutti

(10) Patent No.: US 10,427,186 B2
(45) Date of Patent: Oct. 1, 2019

(54) FRICTION MATERIAL AND METHOD OF FORMING THE SAME

(71) Applicant: Paul A. Stefanutti, West Bloomfield, MI (US)

(72) Inventor: Paul A. Stefanutti, West Bloomfield, MI (US)

(73) Assignee: NATIONAL COATING CORPORATION, Rockland, MA (US)

(*) Notice: Subject to any disclaimer, the term of this patent is extended or adjusted under 35 U.S.C. 154(b) by 372 days.

(21) Appl. No.: 15/499,489

(22) Filed: Apr. 27, 2017

(65) Prior Publication Data

US 2017/0225194 A1 Aug. 10, 2017

Related U.S. Application Data

(63) Continuation of application No. 14/638,508, filed on Mar. 4, 2015, now Pat. No. 9,683,613.

(60) Provisional application No. 61/985,646, filed on Apr. 29, 2014.

(51) Int. Cl.
*B05D 3/12* (2006.01)
*F16D 23/02* (2006.01)
*F16D 69/00* (2006.01)
*F16D 65/18* (2006.01)
(Continued)

(52) U.S. Cl.
CPC .............. *B05D 3/12* (2013.01); *F16D 23/025* (2013.01); *F16D 65/186* (2013.01); *F16D 69/00* (2013.01); *F16D 2069/004* (2013.01); *F16D 2121/04* (2013.01); *F16D 2123/00* (2013.01); *F16D 2250/0046* (2013.01); *F16D 2300/10* (2013.01)

(58) Field of Classification Search
CPC ............... F16D 2300/10; F16D 23/025; B32B 2307/744; B32B 2475/00; B32B 5/16
See application file for complete search history.

(56) References Cited

U.S. PATENT DOCUMENTS

| 2,242,877 A | * | 5/1941 | Albertson | B24D 7/02 |
| | | | | 451/527 |
| 6,352,758 B1 | | 3/2002 | Huang et al. | |
| 6,524,681 B1 | | 2/2003 | Seitz et al. | |

(Continued)

FOREIGN PATENT DOCUMENTS

| CN | 1802518 A | 7/2006 |
| CN | 1215455 A | 2/2013 |

(Continued)

OTHER PUBLICATIONS

International Search Report and Written Opinion for International Application No. PCT/US2016/018736 dated Jun. 18, 2015.

(Continued)

*Primary Examiner* — Alexander M Weddle
(74) *Attorney, Agent, or Firm* — Carlson, Gaskey & Olds, P.C.

(57) ABSTRACT

One exemplary aspect of the present disclosure relates to a method of forming a friction material. The method includes depositing a plurality of particles on a substrate such that the particles provide a plurality of projections and channels between adjacent projections. This disclosure also relates to the friction material itself, and a system including a mechanical component and the friction material.

5 Claims, 1 Drawing Sheet

(51) Int. Cl.
*F16D 121/04* (2012.01)
*F16D 123/00* (2012.01)

(56) References Cited

U.S. PATENT DOCUMENTS

| | | |
|---|---|---|
| 2002/0061723 A1 | 5/2002 | Duescher |
| 2003/0228423 A1 | 12/2003 | Kawai et al. |
| 2004/0115477 A1 | 6/2004 | Nesbitt |
| 2005/0118939 A1* | 6/2005 | Duescher ............... B24D 11/00 451/527 |
| 2005/0223649 A1 | 10/2005 | O'Gary et al. |
| 2006/0121235 A1 | 6/2006 | Nakamaru et al. |
| 2006/0134344 A1 | 6/2006 | Kitahata et al. |
| 2010/0078287 A1 | 4/2010 | Gaffney et al. |
| 2012/0174747 A1 | 7/2012 | Hummel et al. |
| 2014/0106126 A1 | 4/2014 | Gaeta et al. |

FOREIGN PATENT DOCUMENTS

| | | |
|---|---|---|
| CN | 102933867 A | 2/2013 |
| EP | 0486693 A1 | 5/1992 |
| EP | 1632688 A1 | 3/2006 |
| EP | 2592299 A1 | 5/2013 |
| JP | 11193842 | 7/1999 |
| JP | 2000055095 A | 2/2000 |
| JP | 2002234951 A | 8/2002 |

OTHER PUBLICATIONS

Supplementary European Search Report for European Patent Application No. 15785780.6, completed Sep. 20, 2017.

* cited by examiner

FRICTION MATERIAL AND METHOD OF FORMING THE SAME

RELATED APPLICATIONS

This application is a continuation of prior U.S. patent application Ser. No. 14/638,508, filed Mar. 4, 2015, the entirety of which is herein incorporated by reference. The '508 Application claims the benefit of U.S. Provisional Application No. 61/985,646, filed Apr. 29, 2014, the entirety of which is herein incorporated by reference.

BACKGROUND

Friction materials used in high torque applications need to withstand high temperatures. One example application is in the context of synchronizer rings, which are commonly found in manual and dual clutch transmissions. Synchronizer rings are known to include an outer surface having a plurality of gear teeth, and an inner surface having a friction material bonded thereto by way of an adhesive.

One known type of friction material includes machined (i.e., cut) grooves. These friction materials include a consistent density and surface finish throughout. A second type of known friction material also includes pressed or molded grooves and a consistent surface finish throughout. However, unlike the first type, the material within the pressed/molded grooves has an increased density relative to the adjacent, raised material.

BRIEF DESCRIPTION OF THE DRAWINGS

A method of forming a friction material according to an exemplary aspect of the present disclosure includes, among other things, depositing a plurality of particles on a substrate such that the particles provide a plurality of projections and channels between adjacent projections.

A friction material according to an exemplary aspect of the present disclosure includes, among other things, a working layer provided by a plurality of particles. The working layer includes a first section having a first surface finish and a first density. The working layer further includes a second section having a second surface finish different than the first surface finish and a second density different than the first density.

A system according to an exemplary aspect of the present disclosure includes, among other things, a mechanical component, and a friction material connected to the mechanical component. The friction material includes a working layer provided by a plurality of particles. The working layer further includes a first section having a first surface finish and a first density, and a second section having a second surface finish different than the first surface finish and a second density different than the first density.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

Figure 1:
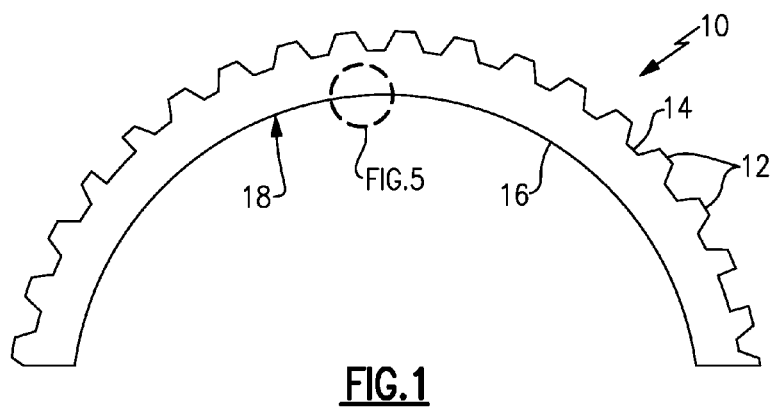

The drawings can be briefly described as follows:
FIG. 1 illustrates an example mechanical component, which in this example is a synchronizer ring.

Figure 2:
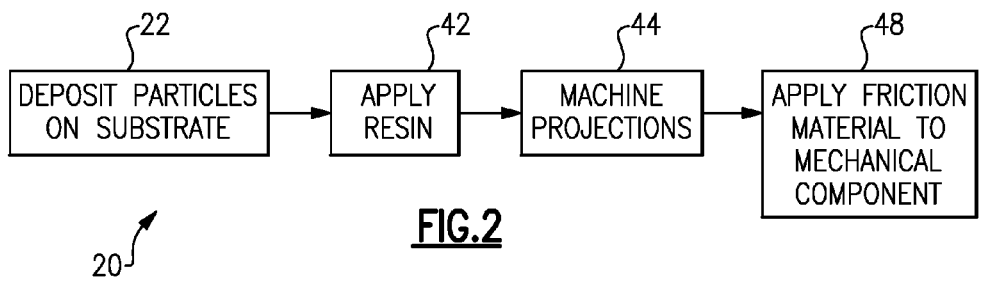

FIG. 2 is a flow chart illustrating an example method of making the disclosed friction material.

FIG. 3 schematically illustrates a hopper assembly, which may be used in the method of FIG. 2.

Figure 4A:
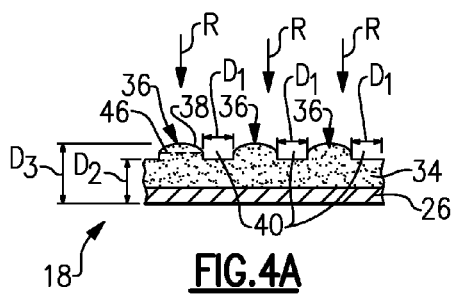
Figure 4B:
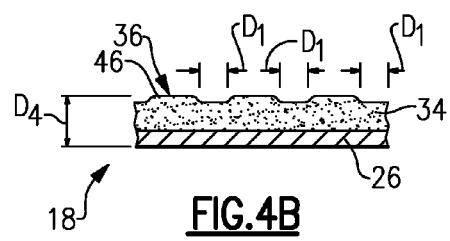

FIGS. 4A-4B are cross-sectional views of the example friction material, and illustrate the friction material at various stages of formation.

Figure 5:
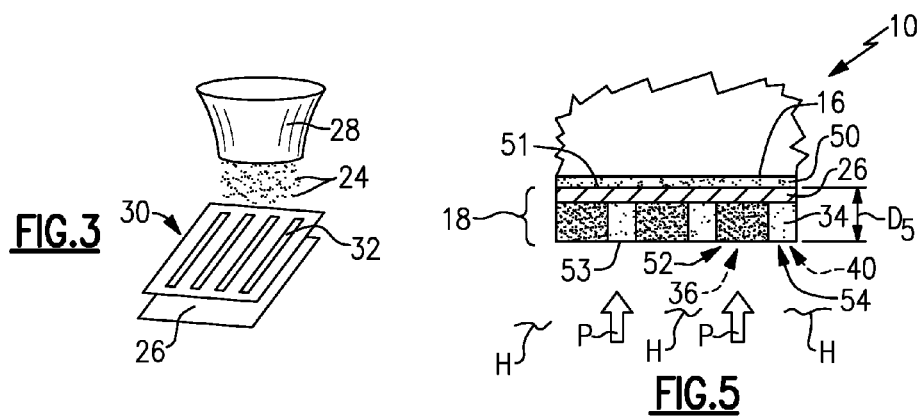

FIG. 5 is a close-up view of the encircled area in FIG. 1.

DETAILED DESCRIPTION

FIG. 1 illustrates an example mechanical component, which in the illustrated example is a synchronizer ring 10. While a synchronizer ring 10 is illustrated, it should be understood that this disclosure extends beyond synchronizer rings. This disclosure is useful in other applications, such as other high torque applications, including, but not limited to, clutch plates and torque converters.

The synchronizer ring 10 includes a plurality of gear teeth 12 extending from a radially outer surface 14 thereof. During operation, a radially inner surface 16 of the synchronizer ring 10 is exposed to large amounts of heat. The radially inner surface 16 includes a friction material 18 bonded thereto by way of an adhesive. The synchronizer ring 10 may be made of steel or brass, as examples.

FIG. 2 illustrates an example method 20 for forming a friction material 18 according to this disclosure. In the method 20, at step 22, a plurality of particles 24 (FIG. 3) are deposited onto a substrate 26. The particles 24 may be selected from any number of materials including carbon, silica, glass, and vermiculite. The substrate 26 may be a carbon fiber weave, paper, textile, aramid, or cloth material, to name a few examples. In one example, the particles 24 are deposited onto the substrate 26 via a hopper 28 and a spreader 30, which includes a plurality of elongate openings 32, as illustrated in FIG. 3. A spreader 30 is not required in all examples.

The result of step 22 is illustrated in FIG. 4A. In FIG. 4A, the friction material 18 includes the substrate 26 and a working layer 34, which is provided by the particles 24. The working layer 34 includes a plurality of projections 36 opposite the substrate 26. The projections 36 are provided by the accumulation of particles caused by the elongate openings 32 in the spreader 30.

After step 22, the projections 36 are naturally provided with a rounded contour 38. Further, the projections 36 are spaced-apart by a distance $D_1$. The distance $D_1$ can vary depending on the particular application (e.g., depending on the size of the synchronizer ring 10). In one example, the distance $D_1$ is within a range of 0.1875 to 0.5 inches. In one specific example, $D_1$ is 0.375 inches.

The spaces between adjacent projections 36 define channels 40. At the channels 40, the friction material 18 has a height $D_2$. The height $D_2$ may be relatively small in some examples. In particular, in one example, the distance $D_2$ may be such that the boundary of the channels 40 is provided by the substrate 26. On the other hand, the friction material 18 has a height $D_3$ at the rounded contour 38 of the projections 36. The distance $D_3$ is greater than the distance $D_2$.

After step 22, a resin R (schematically shown in FIG. 4A) is applied to the friction material 18, at step 42. The particles 24 making up the working layer 34 absorb the resin R. Step 42 may be repeated to ensure an appropriate level of saturation.

At step 44, the projections 36 are machined (e.g., sanded) to essentially flatten the previously rounded contours 38. The flattened height is shown at $D_4$. The height $D_4$ is less than $D_3$ and greater than $D_2$ in one example. FIG. 4A shows, in phantom, the flat contour 46 of the projections 36. FIG. 4B shows the machined projections 36 exhibiting the flat contour 46.

At step 48, the friction material 18 is applied to the mechanical component, which in this example is the synchronizer ring 10. In one example, which is schematically illustrated in FIG. 5, the friction material 18 is bonded to the radially inner surface 16 of the synchronizer ring 10 by an adhesive layer 50. Heat H and pressure P are applied to the friction material 18, the adhesive layer 50, and the synchronizer ring 10 to ensure a proper bond. The adhesive layer 50 may be any known type of adhesive suitable for high temperature applications. The adhesive layer 50 is provided between an outer surface 51 of the friction material 18, which is opposite a radially inner working surface 53 of the friction material 18.

The result of step 48 is shown in FIG. 5. In FIG. 5, the working layer 34 is compressed such that the friction material 18 has a substantially uniform height $D_5$ throughout. The height $D_5$ in one example is less than or equal to the height $D_2$.

When compressed, the working layer 34 has alternating first sections 52 and second sections 54. In this example, the first sections 52 correspond to locations where the projections 36 were provided (projections 36 are illustrated in phantom in FIG. 5). The second sections 54, on the other hand, correspond to locations where the channels 40 were provided (channels 40 are shown in phantom in FIG. 5).

Because of the machining from step 44, the first sections 52 have a first surface finish which is smoother than the surface finish of the second sections 54. Since the second sections 54 are not machined in step 44, the second sections 54 are left with a rougher, more granular surface finish (e.g., because of the unmachined nature of the deposited particles 24).

Further, because the first sections 52 correspond to the locations where the projections 36 once existed, the first sections 52 are more dense than the second sections 54. The reasons for this increase in density is twofold. First, there were more particles forming the projections 36 than in locations adjacent the channels 40. Thus, at step 42, more resin R was absorbed by the projections 36. Second, even after step 44, the flattened projections 36 had a height $D_4$ greater than the height $D_2$ adjacent the channels 40. Thus, when compressed in step 48, the particles within the first sections 52 are packed closer together than the particles in the second sections 54.

By providing the different first and second sections 52, 54, the friction material 18 exhibits good wear characteristics because of the relatively smooth surface of the first sections 52 at the working surface 53. The friction material 18 also exhibits good friction properties because of the granular surface finish of the second sections 54 at the working surface 53. The friction properties of the second sections 54 are particularly beneficial for cold shifting, as the granular nature of the second sections 54 helps to break the cooling fluid (e.g., oil) film adjacent the radially inner surface 16 of the synchronizer ring 10.

Additionally, because the first section 52 has a higher density than the second sections 54, cooling fluid is directed to the second sections 54, and is allowed to permeate through the friction material 18 via the relatively lower density second sections 54, which increases the cooling of the synchronizer ring 10 and the friction material 18 itself. This increase in cooling in turn increases performance of the synchronizer ring, and extends the life of both the synchronizer ring and the friction material.

In the example of FIG. 3, the openings 32 are linear openings, which extend parallel to one another. This provides the friction material 18 with a plurality of linear, parallel first and second sections 52, 54. Other patterns, such as zig-zags, come within the scope of this disclosure, however. While parallel first and second sections 52, 54 are mentioned above, the first and second sections 52, 54 may not be parallel when applied to the radially inner surface 16 of the synchronizer ring 10, as the radially inner surface 16 may be conical.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A method of forming a friction material, comprising:
depositing a plurality of particles on a substantially flat substrate such that the particles provide a plurality of projections and channels between adjacent projections, wherein the projections and channels are formed by the particles as the particles are deposited on the substrate, and wherein, as the particles are deposited, the projections have a greater height than the channels and the channels are substantially parallel to one another.

2. The method as recited in claim 1, further comprising: applying resin to the deposited particles.

3. The method as recited in claim 2, further comprising: machining the projections such that the projections exhibit a flat contour.

4. The method as recited in claim 3, further comprising: compressing the plurality of particles.

5. The method as recited in claim 1, wherein the projections and channels are formed entirely by the particles as the particles are deposited on the substrate.

* * * * *

UNITED STATES PATENT AND TRADEMARK OFFICE
CERTIFICATE OF CORRECTION

PATENT NO. : 10,427,186 B2  
APPLICATION NO. : 15/499489  
DATED : October 1, 2019  
INVENTOR(S) : Paul A. Steffanuti Page 1 of 1

It is certified that error appears in the above-identified patent and that said Letters Patent is hereby corrected as shown below:

On the Title Page

In item (73) Assignee; delete "National Coating Corporation, Rockland, MA (US)"

Signed and Sealed this
Twelfth Day of November, 2019

Andrei Iancu
*Director of the United States Patent and Trademark Office*